United States Patent [19]
Kobayashi et al.

[11] Patent Number: 5,749,093
[45] Date of Patent: May 5, 1998

[54] ENHANCED INFORMATION PROCESSING SYSTEM USING CACHE MEMORY INDICATION DURING DMA ACCESSING

[75] Inventors: Kazushi Kobayashi, Ebina; Takeshi Aoki, Hadano; Koichi Okazawa, Tokyo; Ichiharu Aburano, Hitachi, all of Japan

[73] Assignees: Hitachi, Ltd., Tokyo; Hitachi Computer Electronics Co., Ltd., Hadano, both of Japan

[21] Appl. No.: 389,080

[22] Filed: Feb. 14, 1995

Related U.S. Application Data

[63] Continuation of Ser. No. 728,589, Jul. 11, 1991, abandoned.

[30] Foreign Application Priority Data

Jul. 16, 1990 [JP] Japan ................... 2-187442

[51] Int. Cl.⁶ ............... G06F 12/08; G06F 13/28
[52] U.S. Cl. ............... 711/139; 395/842
[58] Field of Search ............... 395/400, 425, 395/275, 445, 457, 468, 471, 472, 473, 474, 479, 480, 466, 842, 846

[56] References Cited

U.S. PATENT DOCUMENTS

| | | | |
|---|---|---|---|
| 4,504,902 | 3/1985 | Gallaher et al. | 395/462 |
| 4,669,043 | 5/1987 | Kaplinsky | 395/403 |
| 4,959,770 | 9/1990 | Kondo et al. | 395/413 |
| 5,109,491 | 4/1992 | Nakagawa et al. | 395/417 |
| 5,161,162 | 11/1992 | Watkins et al. | 395/183.19 |
| 5,179,689 | 1/1993 | Leach et al. | 395/842 |
| 5,301,287 | 4/1994 | Herrell et al. | 395/412 |
| 5,327,570 | 7/1994 | Foster et al. | 395/800.3 |
| 5,392,436 | 2/1995 | Jansen et al. | 395/293 |
| 5,404,489 | 4/1995 | Woods et al. | 395/479 |

FOREIGN PATENT DOCUMENTS

A-1-193961  3/1989  Japan.

*Primary Examiner*—Eddie P. Chan
*Assistant Examiner*—Kevin L. Ellis
*Attorney, Agent, or Firm*—Kenyon & Kenyon

[57] ABSTRACT

An information processing system includes a central processing unit, a main storage, a main storage controller for controlling the main storage, a cache memory having a content of at least one part of addresses stored in the main storage, at least one DMA controller which is capable of referring to the main storage and a DMA address translation unit for translating a logical address outputted from the DMA controller into a physical address for referring to the main storage. The DMA address translation unit has a flag representing whether or not the cache memory is referred to on DMA. The main storage controller performs either of reference to the cache memory or direct reference to the main storage based upon the flag on DMA.

13 Claims, 3 Drawing Sheets

ENHANCED INFORMATION PROCESSING SYSTEM USING CACHE MEMORY INDICATION DURING DMA ACCESSING

This is a continuation of application Ser. No. 07/728,589, filed Jul. 11, 1991, now abandoned.

BACKGROUND OF THE INVENTION

The present invention relates to a DMA control method in an information processing system.

Many information processing systems have address translation for translating logical addresses which are dealt by programs into main storage addresses, that is, physical addresses to implement a virtual storage system.

The address translation usually adopts a page system in which a logical address space is divided into spaces each having a predetermined size, that is, page units, and translation from logical to physical addresses is performed in units of pages.

Although the utilization efficiency of a main storage is enhanced by address translation relying upon the page system, a plurality of pages having sequential logical addresses correspond to pages having diverse physical addresses in main storage.

Accordingly, a control which enables data of a plurality of pages continuous on logical addresses to be transferred is necessary for performing a direct memory access (hereafter referred to as DMA) from an input/output control to a main storage.

In one prior art approach, there is a system in which an address translation table for DMA is provided. This is disclosed in JP-A-1-193961.

The DMA address translation table has page addresses for generating physical addresses from logical addresses outputted from an input/output control.

By the above-mentioned system, the input/output control can be implemented with a relatively simple hardware. DMA transfer to a continuous area on the logical addresses can thus be achieved.

For ensuring an agreement between the content of a cache memory and the content in a main storage on DMA, a facility for referring to the cache memory on DMA has generally been provided.

Since the cache memory is occupied for DMA while DMA is performed in the prior art, access from a CPU to the cache memory cannot be made during DMA.

Therefore, there has been a problem that the processing performance of the CPU is lowered during DMA operation.

SUMMARY OF THE INVENTION

The present invention enhances the processing performance of a CPU by enabling access from the CPU to a cache memory during DMA.

The present invention provides, an information processing system including a central processing unit, a main storage, a main storage controller for controlling said main storage, a cache memory having a content of at least one part of addresses stored in said main storage, at least one DMA controller which is capable of referring to the main storage and DMA address translator for translating a logical address outputted from the DMA controller into a physical address for referring to said main storage, characterized in that said DMA address translator has a flag representative of whether or not said cache memory is referred to on DMA and said main storage controller performs either a reference to said cache memory or a direct reference to said main storage based upon said flag.

The central processing unit presets address translation information before the central processing unit instructs the DMA controller to start DMA transfer. At this time the central processing unit determines whether or not reference to the cache memory is required for presetting a value of the flag (cache memory reference control flag).

After the starting of a DMA by the central processing unit, the main storage controller for controlling the main storage determines a main storage address to be accessed by the DMA address translator in accordance with an address provided as an output from the DMA controller.

If the value of the cache memory reference control flag in the DMA address translator represents that reference to the cache memory is necessary, the cache memory is referred to.

If the value of the reference control flag of the cache memory represents that reference to the cache memory is not necessary, the cache memory is not referred to and the main storage is directly accessed.

Therefore, if the cache memory is not referred to even during DMA, access from the CPU to the cache memory becomes possible so that an otherwise negative effect of DMA on CPU processing performance can be suppressed.

DETAILED DESCRIPTION

Now, preferred embodiments of the present invention will be described with reference to the drawings.

Figure 1:
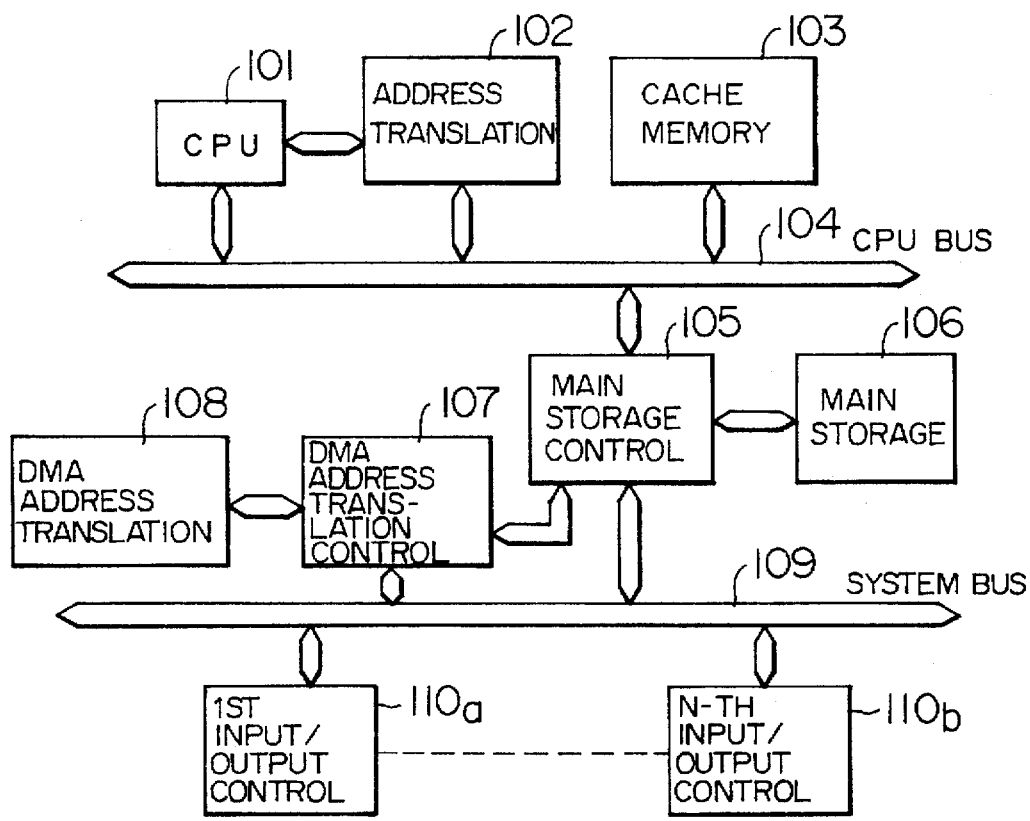
FIG. 1 is a block diagram showing structure of a first embodiment of the present invention.

FIG. 1 is a block diagram showing the structure of a first embodiment of an information processing system of the present invention.

The first embodiment comprises a CPU 101 which is a central processing unit, an address translator 102, a cache memory 103, a CPU bus 104, a main storage control 105 which is main storage controller for controlling the main storage, a main storage 106, a DMA address translation control 107 and a DMA address translation table 108 which together constitute a DMA address translator or translation means, a system bus 109, and first to n-th input/output controls 110a to 110b which are DMA control elements.

One or more input/output devices (not shown) are connected to each of the input/output controls.

Now, operation will be described.

If a program of data stored in the main storage is referred to by the CPU 101, a logical address is translated into an address of the main storage (physical address) by the address translator 102 and access to the cache memory 103 or to the main storage 106 is made through the CPU bus 104.

If a relevant address content exists in the cache memory 103, data transfer between the main storage 106 and the cache memory is not made and program or data transfer is made between the CPU 101 and the cache memory 103 through the CPU bus 104.

On DMA, an input/output control output address, a logical address which is outputted from any one of the first to n-th input/output controls 110a to 110b is inputted to the DMA address translation control 107 through the system bus 109.

Then, the input/output control output address 201 is translated into a main storage address (physical address) 202 by the DMA address translation control 107 using the DMA address translation table 108.

The translated main storage address 202 is inputted to the main storage controller 105 so that the main storage 106 is referred to.

Figure 2:
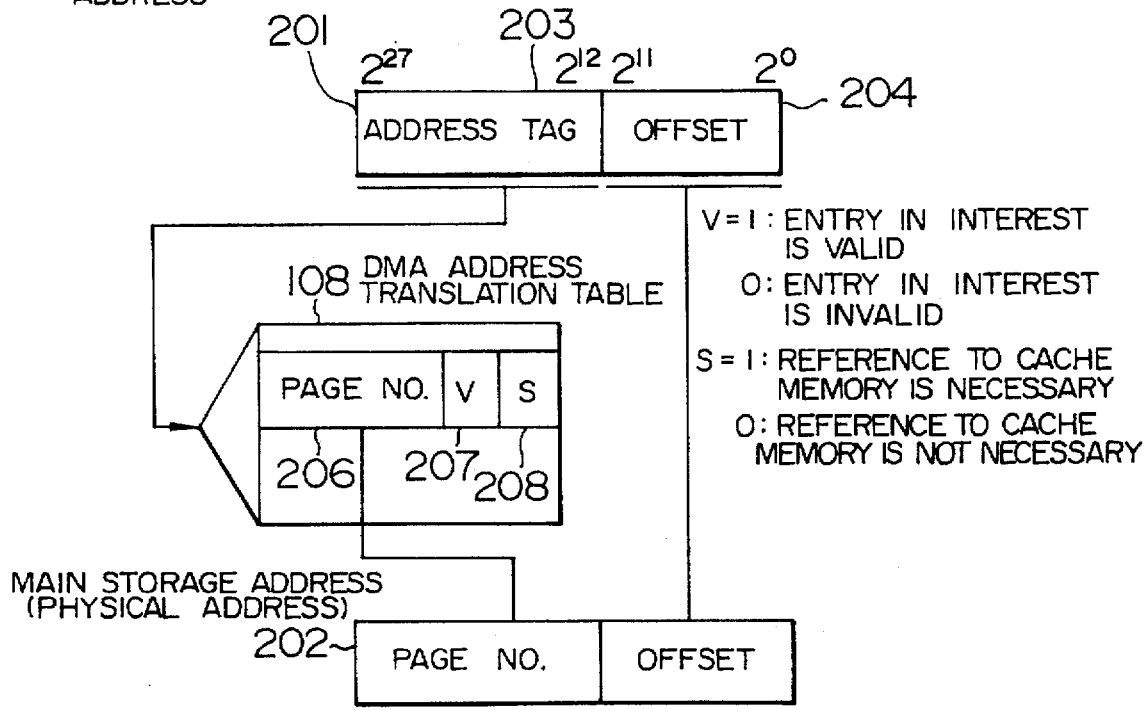
FIG. 2 is an explanatory view showing an accessing method by a DMA address translation table.

Now, address translation on DMA will be described in detail with reference to FIG. 2.

The input/output control output address 201 is divided into an address tag 203 and an offset 204. The content in the DMA address translation table 108 is read out in accordance with the value of the address tag 203 representative of the reference destination (entry) in the DMA address translation table.

Each entry in the DMA address translation table 108 has a page number 206, a V bit 207, and an S bit 208.

The page number 206 is added with the offset 204 of the input/output control output address 201 to become a main storage address 202.

The V bit 207 is a flag representative of whether or not the page number in the entry in interest of the DMA address translation table 108 is valid.

The S bit 208 is a flag representative of whether or not reference to the cache memory is necessary in association with the DMA in interest. If S=1, it represents that reference to the cache memory is necessary. If S=0, it represents that reference to the cache memory is not necessary.

The value of the read-out S bit 208 is inputted to the main storage control 105 together with the main storage address 202. If S=1, the main storage control performs bus arbitration with the CPU 101 and acquires a bus priority of the CPU bus 104 to refer to the cache memory 103.

If S=1 and the content of the address of interest exists in the cache memory 103, the content is read out or updated according to needs.

Even if S=1, if the content of the address of interest does not exist in the cache memory, the main storage 106 is referred to.

If S=0, the cache memory 103 is not referred to and the main storage 106 is directly referred to.

Now, presetting of the content in the DMA address translation table will be described.

The content in the DMA address translation table 108 is controlled by the CPU.

The page number 206 which is address translation information is preset based upon the correspondence between the logical address 201 and the main storage address 202.

Figure 3:
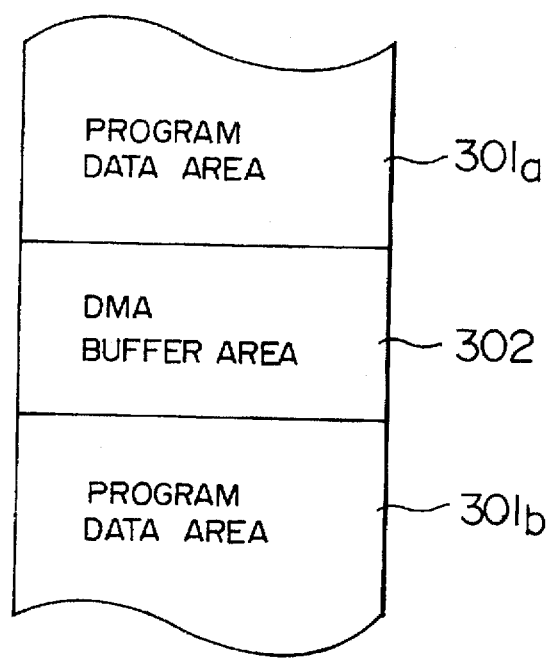
FIG. 3 is an explanatory view showing an address map of the main storage.

Presetting of the value of the S bit 208 will be described with reference to an address map of the main storage 106 shown in FIG. 3.

The value of the S bit is determined depending upon whether or not there is the possibility that the area of the main storage 106 which is an object of the DMA transfer exists in the cache memory.

That is, the main storage 106 is divided into program data areas 301a and 301b in which usual programs and data are stored, respectively and a DMA buffer area 302. The DMA buffer area 302 is not used as an object of the cache memory on access from the CPU.

When the DMA buffer area 302 is registered in the DMA address translation table 108, the S bit of the DMA address translation table is set to zero. When the usual program and data areas are registered in the DMA address translation table 108, S is set to 1.

In the first instance where S=0, direct access to the main storage is made without interrupting the transfer between the CPU and the cache memory when DMA transfer to an area in which cache memory reference is not necessary. Therefore, this reduces the likelihood of lowering the CPU processing performance due to DMA access.

Since determination as to whether or not reference to the cache memory on DMA transfer is necessary is made based upon whether or not the object area of the DMA transfer is the usage object area of the cache memory, the usage object area of the cache memory is also referred to on DMA transfer and the area of the cache memory which is not the usage object is not referred to on DMA transfer. Accordingly, disagreement between the contents of the cache memory and of the main storage due to DMA transfer will not occur.

Information as to whether or not the cache memory is referred to is not limited to presetting of the flag in the DMA address translation table. A sole device for holding information representing whether or not reference is made may be provided.

Further, the DMA control means may be provided with a table having this information therein.

A second embodiment of the present invention will be described.

Figure 5:
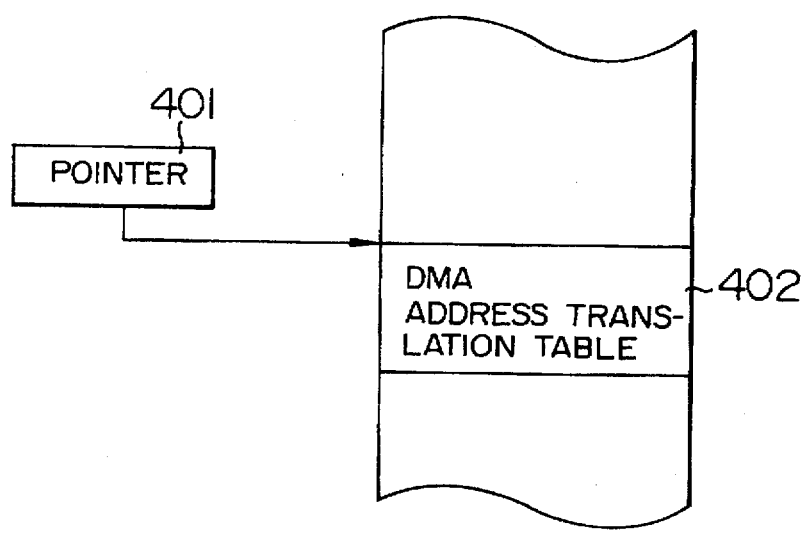
FIG. 5 is an explanatory view showing an accessing method to a DMA address translation table in the second embodiment of the present invention.
Figure 4:
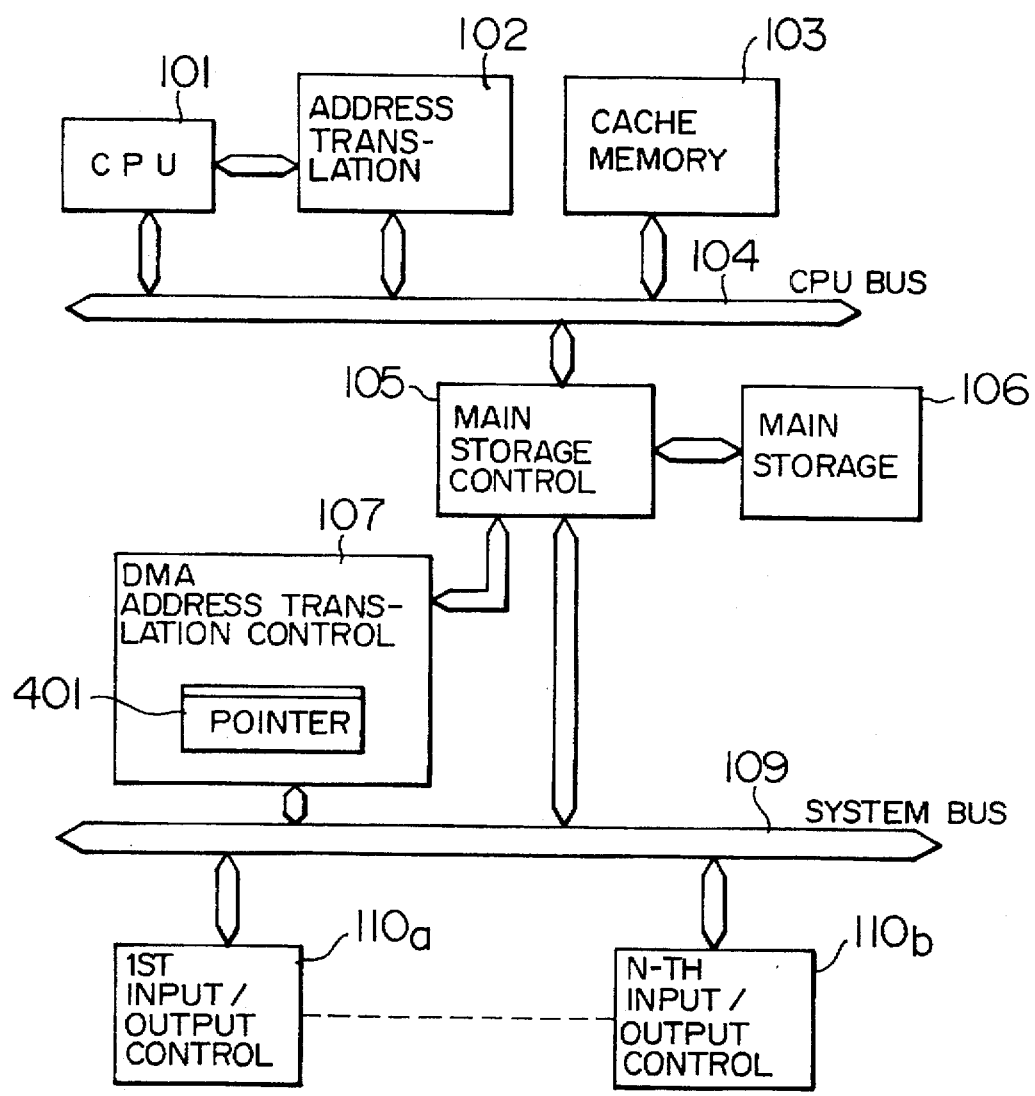
FIG. 4 is a block diagram showing the structure of a second embodiment of the present invention.

FIG. 4 is a block diagram showing the structure of the second embodiment. FIG. 5 is a view showing a method of access to a DMA address translation table in the second embodiment.

The structure of the second embodiment is characterized in that the DMA address translation control 107 which is DMA address translation means is provided with a pointer for storing a lead address of the DMA address translation table and that DMA address translation table 402 is provided in the main storage 106.

The second embodiment comprises a CPU 101 which is a central processing unit, an address translator 102, a cache memory 103, a CPU bus 104, a main storage control 105 which is main storage controller for controlling the main storage, a main storage 106, a DMA address translation control 107 and a DMA address translation table 108 which together constitute a DMA address translator or translation means, a system bus 109, and first to n-th input/output controls 110a to 110b which are DMA control means.

One or more input/output devices (not shown) are connected to each of the input/output controls.

Now, operation of this second embodiment will now be described.

If a program or data stored in the main storage is referred to by the CPU 101, a logical address is translated into an address of the main storage (physical address) by the address translator 102 and access to the cache memory 103 or to the main storage 106 is made through the CPU bus 104.

If a relevant address content exists in the cache memory 103, data transfer between the main storage 106 and the cache memory is not be made and program or data transfer is made between the CPU 101 and the cache memory 103 through the CPU bus 104.

On DMA access, the content of the DMA address translation table 402 in the main storage 106 is read by using the address tag 203 of the input/output control output address 201 outputted from any one of the first to n-th input/output controls 110a to 110b and the pointer 401 and is translated into the main storage address 202.

The structure of each entry in the DMA address translation table 402 and the details of operation of address translation on DMA are identical with those of the first embodiment. In accordance with the second embodiment, there is provided an effect that the DMA address translation table 108 can be commonly used with the main storage 105 so that the amount of hardware can be reduced in addition to obtaining the beneficial effects of the first embodiment.

What is claimed is:

1. An information processing system comprising:

a main storage;

a cache memory storing a subset of data stored in said main storage;

a main storage controller performing access to said main storage;

a central processing unit capable of accessing the main storage through said main storage controller and capable of accessing said cache memory;

at least one DMA controller capable of accessing the main storage and said cache memory through said main storage controller; and a DMA address translator translating a logical address outputted from the DMA controller into a physical address for accessing said main storage and said cache memory;

wherein said DMA address translator has an associated flag representative of whether or not said main storage controller accesses said cache memory for a DMA access at which a DMA controller accesses said main storage through said main storage controller;

wherein said central processing unit divides said main storage into a buffer area for data to be transferred by DMA and other areas, sets an associated flag corresponding to said buffer area for data to be transferred by DMA to have a value indicative of not accessing said cache memory, and sets an associated flag corresponding to said other areas to have a value indicative of accessing said cache memory; and wherein said main storage controller receives said translated physical address together with said associated flag from said DMA address translator and accesses on the basis of said associated flag either said main storage without accessing said cache memory or said cache memory during said DMA access to said main storage.

2. The information processing system of claim 1, wherein said central processing unit accesses the cache memory during said DMA access to said main storage when said main storage controller accesses on the basis of said associated flag said main storage without accessing said cache memory.

3. An information processing system according to claim 1, further comprising a bus connected to said central processing unit and said cache memory, wherein said central processing unit is capable of accessing said cache memory via said bus.

4. An information processing system according to claim 1, further comprising:

a central processing unit bus connected to said central processing unit, to said cache memory, and to said main storage controller; and a system bus connected to said main storage controller and to said DMA controller.

5. An information processing system comprising:

a main storage;

a cache memory storing a subset of data stored in said main storage;

a main storage controller performing either access to said main storage;

a central processing unit capable of accessing the main storage through said main storage controller and capable of accessing said cache memory; and at least one DMA controller capable of accessing said main storage and said cache memory through said main storage controller;

wherein said system further comprises means for holding information representative of whether or not said main storage controller accesses said cache memory for a DMA access at which a DMA controller accesses said main storage through said main storage controller;

wherein said central processing unit divides said main storage into a buffer area for data to be transferred by DMA and other areas, sets an associated flag corresponding to said buffer area for data to be transferred by DMA to have a value indicative of not accessing said cache memory, and sets an associated flag corresponding to said other areas to have a value indicative of accessing said cache memory; and wherein said main storage controller performs direct access to said main storage without accessing said cache memory when said information represents that said cache memory need not be accessed during said DMA access to said main storage.

6. The information processing system of claim 5, wherein said central processing unit accesses the cache memory during said DMA access to said main storage when said main storage controller performs said direct access to said main storage without accessing said cache memory.

7. An information processing system according to claim 5, further comprising a bus connected to said central processing unit and said cache memory, wherein said central processing unit is capable of accessing said cache memory via said bus.

8. An information processing system according to claim 5, further comprising:

a central processing unit bus connected to said central processing unit, to said cache memory, and to said main storage controller; and a system bus connected to said main storage controller and to said DMA controller.

9. A DMA control device for an information processing system having a central processing unit, a cache memory, a main storage and a main storage controller performing access to said main storage, comprising:

at least one DMA controller; and means for outputting DMA address information to said main storage controller on the basis of information from said DMA controller;

wherein said cache memory is commonly accessible by said central processing unit and said at least one DMA controller, wherein said DMA controller has a table for holding first information representative of whether or not said cache memory is accessed during a DMA access to said main storage for which a DMA controller accesses said main storage through said main storage controller, and said output means outputs, together with said DMA address information, second information as to whether said cache memory needs to be accessed on the basis of said first information during said DMA access to said main storage, to said main storage controller, and wherein said main storage is divided into a buffer area for data to be transferred by DMA and other areas, an associated flag corresponding to said buffer area for data to be transferred by DMA being set to have a value indicative of not accessing said cache memory, and an associated flag corresponding to said other areas being set to have a value indicative of accessing said cache memory.

10. A DMA control device according to claim 9, said information processing system further comprising a bus connected to said central processing unit and said cache memory, wherein said central processing unit is capable of accessing said cache memory via said bus.

11. A DMA control device according to claim 9, said information processing system further comprising:

a central processing unit bus connected to said central processing unit, to said cache memory, and to said main storage controller; and a system bus connected to said main storage controller and to said DMA controller.

12. The DMA control device for an information processing system of claim 9, wherein said main storage controller directly accesses said main storage without accessing said cache memory in response to said second information.

13. The DMA control device for an information processing system of claim 12, wherein said central processing unit accesses the cache memory during said DMA access to said main storage.

* * * * *

UNITED STATES PATENT AND TRADEMARK OFFICE
CERTIFICATE OF CORRECTION

PATENT NO. : 5,749,093
DATED : 5 May 1998
INVENTOR(S) : Kazushi KOBAYASHI et al.

It is certified that error appears in the above-identified patent and that said Letters Patent is hereby corrected as shown below:

| Column | Line | |
|--------|------|---|
| 1 | 39 | After "with" delete "a". |
| 4 | 53 | Change "control means" to --control elements--. |

Signed and Sealed this

First Day of December, 1998

Attest:

BRUCE LEHMAN

*Attesting Officer*     *Commissioner of Patents and Trademarks*